(12) United States Patent
Gorski

(10) Patent No.: US 12,184,762 B2
(45) Date of Patent: Dec. 31, 2024

(54) REMOVABLE TRUSTED PLATFORM MODULE

(71) Applicant: Xerox Corporation, Norwalk, CT (US)

(72) Inventor: James P. Gorski, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 228 days.

(21) Appl. No.: 17/850,113

(22) Filed: Jun. 27, 2022

(65) Prior Publication Data

US 2023/0421362 A1   Dec. 28, 2023

(51) Int. Cl.
*H04L 9/08* (2006.01)
*H04L 67/141* (2022.01)

(52) U.S. Cl.
CPC .......... *H04L 9/0825* (2013.01); *H04L 9/0877* (2013.01); *H04L 67/141* (2013.01)

(58) Field of Classification Search
CPC ... H04L 9/0825; H04L 9/0877; H04L 67/141; H04L 9/088; H04L 9/0897; H04L 67/142; H04L 9/08; G06F 21/575
See application file for complete search history.

(56) References Cited

U.S. PATENT DOCUMENTS

| | | | |
|---|---|---|---|
| 8,219,729 B1 * | 7/2012 | Wright | G06F 13/4022 710/104 |
| 8,245,053 B2 | 8/2012 | Hoang et al. | |
| 9,338,656 B2 | 5/2016 | Deutsch et al. | |
| 10,320,571 B2 | 6/2019 | Thom et al. | |
| 10,432,744 B2 * | 10/2019 | Shimakawa | H04L 67/145 |
| 11,194,913 B2 | 12/2021 | Gupta et al. | |
| 11,289,443 B2 | 3/2022 | Jackson et al. | |
| 2006/0236408 A1 | 10/2006 | Yan | |
| 2008/0046898 A1 | 2/2008 | Malina | |
| 2009/0292919 A1 | 11/2009 | England | |
| 2010/0235648 A1 | 9/2010 | Hoang | |
| 2018/0019920 A1 * | 1/2018 | Agarwal | H04L 41/0846 |
| 2018/0181762 A1 * | 6/2018 | Poornachandran | G06F 21/575 |
| 2019/0200400 A1 * | 6/2019 | Liu | H04L 41/0897 |
| 2021/0350017 A1 * | 11/2021 | Gordon | G06F 21/602 |

OTHER PUBLICATIONS

European Search Report, Application No. EP 23 18 1593, Oct. 30, 2023.

* cited by examiner

*Primary Examiner* — Quazi Farooqui
(74) *Attorney, Agent, or Firm* — Gibb IP Law Firm, LLC

(57) ABSTRACT

Apparatuses have a processing device that is operable with a connection to a physical cryptographic key device that has a valid cryptographic key. Such devices further include a connector that is adapted to connect to the physical cryptographic key device. The processing device is operatively connected to the connector. The processing device is adapted to change available functionality based on connection to, and disconnection from, the physical cryptographic key device.

17 Claims, 4 Drawing Sheets

REMOVABLE TRUSTED PLATFORM MODULE

BACKGROUND

Systems and methods herein generally relate to trusted platforms that use cryptographic keys to boot and perform other action and more particularly to devices that utilize trusted platform modules (TPMs).

Securing computing devices is useful to business to preserve high value intellectual property. An aspect of sophisticated devices that prevents unauthorized access to protected components is the use of trusted systems. Trusted systems utilize cryptographic keys during power-on operations from a powered-down state (e.g., boot operations) or other initialization operations to restrict access and functionality. Such trusted systems can include a Trusted Platform Module (TPM) that is permanently attached (physically) to circuitry (e.g., usually soldered on a motherboard or similar component). The TPM supplies a unique cryptographic key (e.g., Master Volume Key (MVK)) to the devices operational components to allow such devices to boot from a powered-down state.

The MVK is thus used as the secret key to encrypt or decrypt other secrets within the device, such as for encryption of the device storage (typically hard disk drive or solid state memory). Specifically, one or more cryptographic keys maintained by the TPM permits the computer routines used to perform boot operations to be encrypted. This provides a layer of protection to the device's software, which can be very valuable. The devices will not be able to decrypt the computer routines without the cryptographic key(s) maintained by the TPM, which can prevent the components of the device from booting from a power-down state if the TPM is missing.

Possession of a TPM can provide sophisticated individuals the ability to obtain the cryptographic key and eventually copy items, such as the source code for the highly-valued boot routines. Individuals are increasingly working remotely and/or from shared workspaces where physical security of computing devices cannot be ensured through traditional means. Because the TPM is not removable and travels with the device, a malicious actor who obtains the TPM can use and steal highly valuable secrets of the device.

SUMMARY

Exemplary apparatuses herein include (among other components) a processing device that is operable with a connection to a physical cryptographic key device that has a valid cryptographic key. Such devices further include a connector that is adapted to connect to the physical cryptographic key device. The processing device is operatively (directly or indirectly) connected to the connector. The processing device is adapted to change available functionality based on connection to, and disconnection from, the physical cryptographic key device.

Other apparatuses herein similarly include a motherboard and secure processing devices connected to the motherboard. The secure processing devices are only operable with a connection to a Trusted Platform Module (TPM) having a valid cryptographic key. Such devices further include a connector adapted to connect to the TPM. The secure processing devices are operatively connected to the connector. The secure processing devices can change their available functionality based on connection to, and disconnection from, the TPM.

Additional apparatuses herein are publicly shared document processing devices that also include a motherboard and secure document processing devices connected to the motherboard. The secure document processing devices are only operable with a connection to a Trusted Platform Module (TPM) having a valid cryptographic key. These devices also include a connector (which can be a physical connection or wireless) adapted to connect to the TPM. The secure document processing devices are operatively connected to the connector.

The secure document processing devices can change their available functionality based on connection to, and disconnection from, the TPM. The secure document processing devices may periodically require reconnection to the TPM for continued functionality. The secure document processing devices are adapted to end a current session and erase temporary memory when a connected TPM is no longer connected. In one example, the secure document processing devices require the connection to the TPM only when powering-up from a non-powered state. In other examples, the secure document processing devices require the connection to the TPM for selected functions (e.g., security-enabled functions) but do not require the connection to the TPM for other functions (e.g., non-secure functions).

These and other features are described in, or are apparent from, the following detailed description.

BRIEF DESCRIPTION OF THE DRAWINGS

Various exemplary systems and methods are described in detail below, with reference to the attached drawings, in which.

DETAILED DESCRIPTION

As mentioned above, because conventional Trusted Platform Modules (TPMs) are soldered to the motherboard and are not removable, the TPMs travel with the devices, permitting a malicious actor who obtains a TPM to use and steal highly valuable secrets of a device. In view of such issues, with devices disclosed herein, the TPM may be supplied only during boot operations and the TPM can be safely removed after the device boots. So long as the device remains powered-up, it can have full functionality.

Specifically, some apparatuses herein include a motherboard and secure processing devices connected to the motherboard. The secure processing devices are only operable with a connection to a Trusted Platform Module (TPM) having a valid cryptographic key. Such devices further include a physical or wireless connector adapted to connect to the TPM. The secure processing devices are operatively connected to the connector. The secure processing devices can change their available functionality based on connection to, and disconnection from, the TPM.

Through physical removal of the TPM, any operations that require the TPM will be made non-functional. For example, booting of the device from a powered-down state into operating mode may not be possible without the TPM. Therefore, if an actor unplugs and moves a publicly available device to a different location, the device will not boot up when repowered because the TPM is not present. Therefore, keeping the TPM physically separated from a device imposes significantly more effort for a malicious attacker who gains possession of the device, lowering the reward for malicious action against the device, which might be stored in a public or common workplace.

Such devices with removable TPMs are useful in, for example, public space multi-function printer (MFP) deployment. In one example, a business may deploy a public-use MFP in an airport lobby. The public-use MFP can be booted with a removable TPM in place and configured for use. Once the public-use MFP is fully operational, the TPM can be removed. If a malicious user steals the public-use MFP, the MFP will not boot and the MFP's secrets will not be revealed to the malicious user because the malicious user lacks the associated root of trust provided by the removed TPM.

Figure 1:
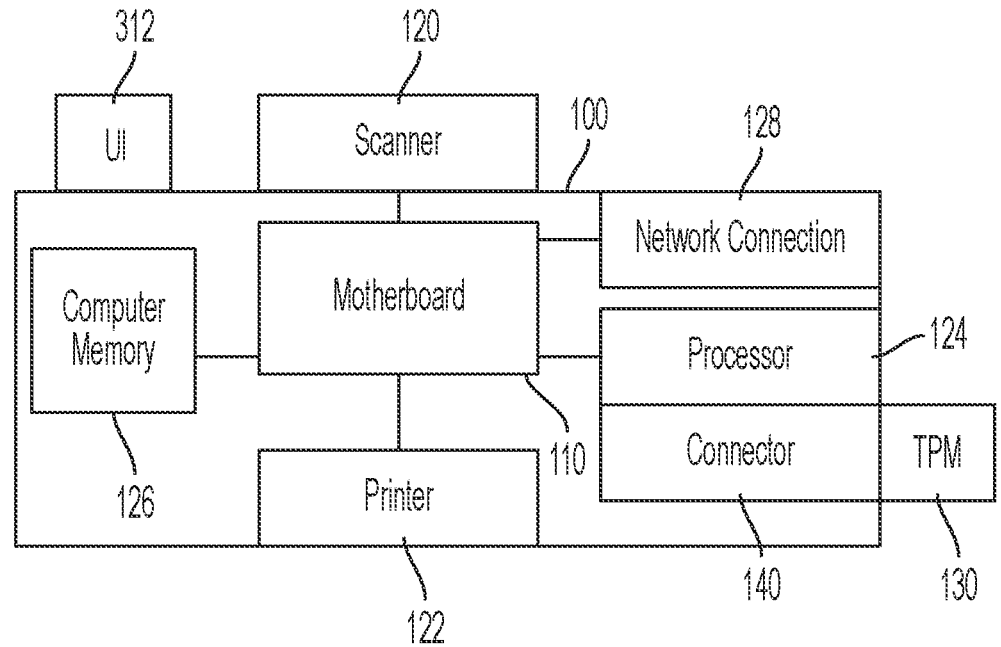
FIG. 1 is a schematic diagram illustrating devices herein.

In one example shown in FIG. 1, the apparatuses herein can be a (potentially publicly shared) document processing device 100. The document processing device can, for example, have functionalities such as printing, scanning, copying, emailing, faxing, etc.

As shown in FIG. 1, the publicly shared document processing device 100 can include a user interface 312, a motherboard 110 and potentially secure document processing devices 120, 122, 124, 126, 128 connected (directly or indirectly through wired connections or other components) to the motherboard 110 and such devices may be permanently connected to the motherboard 110 directly (e.g., soldered), through wired connections (e.g., cables), or through other devices. In some examples, the secure processing devices can be one or more scanning devices 120, one or more printing devices 122, one or more computerized processors 124, one or more memory devices 126, network connection devices 128, etc.

Figure 2:
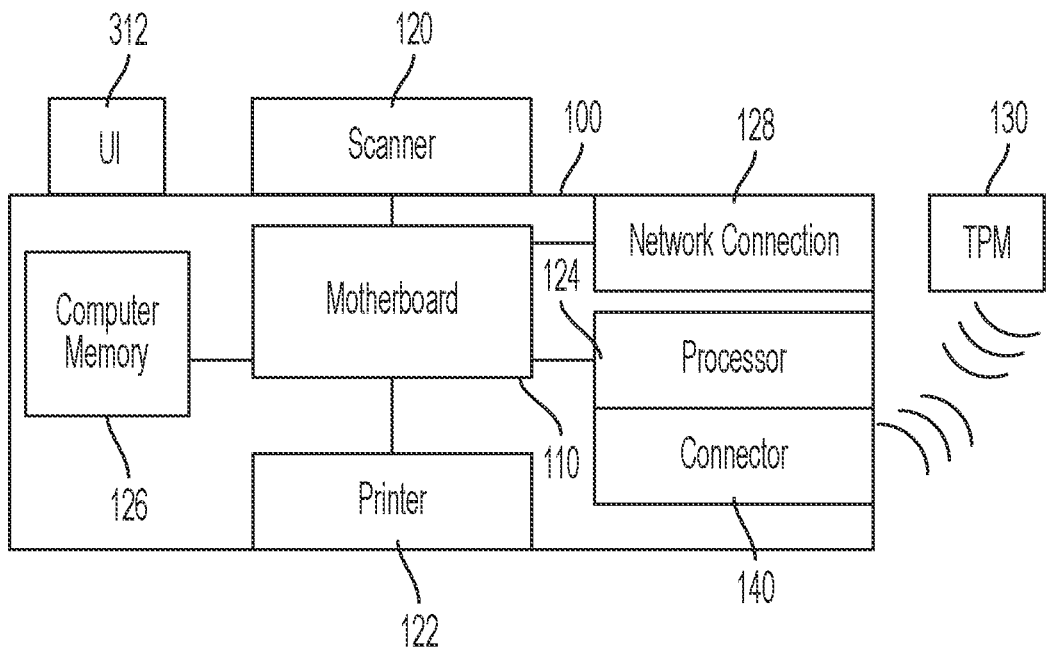
FIG. 2 is a schematic diagram illustrating devices herein.

These secure document processing devices 120, 122, 124, 126, 128 may only be bootable with a connection to a Trusted Platform Module (TPM 130) having a valid cryptographic key. These document processing devices 100 also include a connector 140 (which can be a physical connector as shown in FIG. 1 or wireless as shown in FIG. 2) adapted to connect to the TPM 130. The secure document processing devices 120, 122, 124, 126, 128 are operatively connected to the connector 140.

In one example, the secure document processing devices 120, 122, 124, 126, 128 can require the connection to the TPM 130 only when powering-up from a non-powered state. As an alternative to requiring the presence of the TPM at start-up, the secure document processing devices 120, 122, 124, 126, 128 may only change their available functionality based on a connection to, and disconnection from, the TPM 130. In other examples, the secure document processing devices 120, 122, 124, 126, 128 can require the connection to the TPM 130 for selected functions (e.g., higher cost functions, security-enabled functions, etc.) but not require the connection to the TPM for other functions (e.g., basic operating functions, non-secure functions, etc.). In other options, the secure document processing devices 120, 122, 124, 126, 128 may periodically require reconnection to the TPM 130 for continued functionality. The secure document processing devices 120, 122, 124, 126, 128 can be adapted to end a current session and erase temporary memory 126 when a TPM 130 is removed or no longer connected.

Therefore, the range of device 100 functionality can vary with or without a wired or wireless connection 140 to a corresponding TPM 130. In some situations, the devices 120, 122, 124, 126, 128 can be configured to have all operations fully functional once the TPM 130 is used to boot the device 100 from a powered-down state. In other situations, the device 100 may not need the TPM 130 to boot; however, the device 100 may have limited functionality, where the functionality can be limited to, for example, only non-secure functions. In such devices 100, while the TPM 130 is connected, the full functionality of the devices 120, 122, 124, 126, 128 can be enabled by using the cryptographic key in the TPM 130 to decrypt the software/firmware stored in the computer memory 126 that provides the additional secure functionality of the device 100. In some devices 100, removal of the TPM 130 can stop access to such additional functionality, while on other devices 100, the additional functionality afforded by the TPM 130 can remain until the device 100 is rebooted. Also, all functionality (or just the additional secure functionality) can be available only for set time periods (e.g., one month, one quarter, etc.) after which such functionality ceases until the TPM 130 is reconnected.

In a specific example, a remote worker may be provided a desktop printer/scanner (represented by item 100 in FIGS. 1 and 2) that is set-up by a company technician. During setup, the company technician can connect a corresponding TPM 130 to the printer/scanner 100 and this provides the needed cryptographic key to enable booting capability and full functionality of all secure and non-secure capabilities of the desktop printer/scanner 100. Some additional functionality may permit the desktop printer/scanner 100 to store/retrieve documents from a remote secure server, send emails through a secure email system, connect to remote or local networks, etc., without requiring further inputs from the remote worker.

If power is lost or the remote worker moves and unplugs the desktop printer/scanner 100, the TPM 130 may not be needed for boot operations or to enable basic functionality, such as printing (122) from a connected local computer, scanning (120) to a connected local computer, etc., but the additional desktop printer/scanner secure functionality of connecting to remote secure servers and email systems (e.g., through the network connection 128) may not be enabled until the company technician reconnects the TPM 130 to the desktop printer/scanner 100. In other examples, the corresponding TPM 130 may be shipped to the remote worker and later returned once the additional secure functionality is enabled.

In another example, a publicly shared document processing device (again represented by item 100 in FIGS. 1 and 2, e.g., at an airport, an event venue, a shared office space, etc.) may not boot from an unpowered state unless a corresponding TPM 130 is connected. Here, the full functionality of the device 100 can remain so long as the device 100 is not powered down. In other alternatives, the device 100 may lose some or all of its functionality if a time period expires, at which (or before which) the TPM 130 must be reconnected to extend the functionality for another similar time period.

In an additional example, a publicly accessible device 100 (again represented by item 100 in FIGS. 1 and 2, e.g., a kiosk) may be adapted to have different secure functionality based on which of a plurality of different TPMs 130 is connected. For example, each user may maintain their own TPM 130, which may be incorporated into their ID badge, or may be a separate stand-alone TPM 130 physical hardware element. When one user connects their TPM 130 to the kiosk 100 using the connector 140, the cryptographic key(s) in the first TPM 130 are used to decrypt software/firmware of the device 100 that provides functional access to a first corporate network or server. When the first TPM 130 is removed from the connector 140, the functional access to the first network/server stops because the required cryptographic key(s) are no longer present. A second user can similarly connect a different TPM 130 to the same kiosk 100 using the connector 140, decrypting the functionality that allows access to a different network or server. Again, when the second user disconnects their TPM 130 from the kiosk connector 140, such functionality stops. This allows different users of the same device 100 (e.g., kiosk) with different TPMs 130 to enable different functional features of the kiosk.

Figure 3:
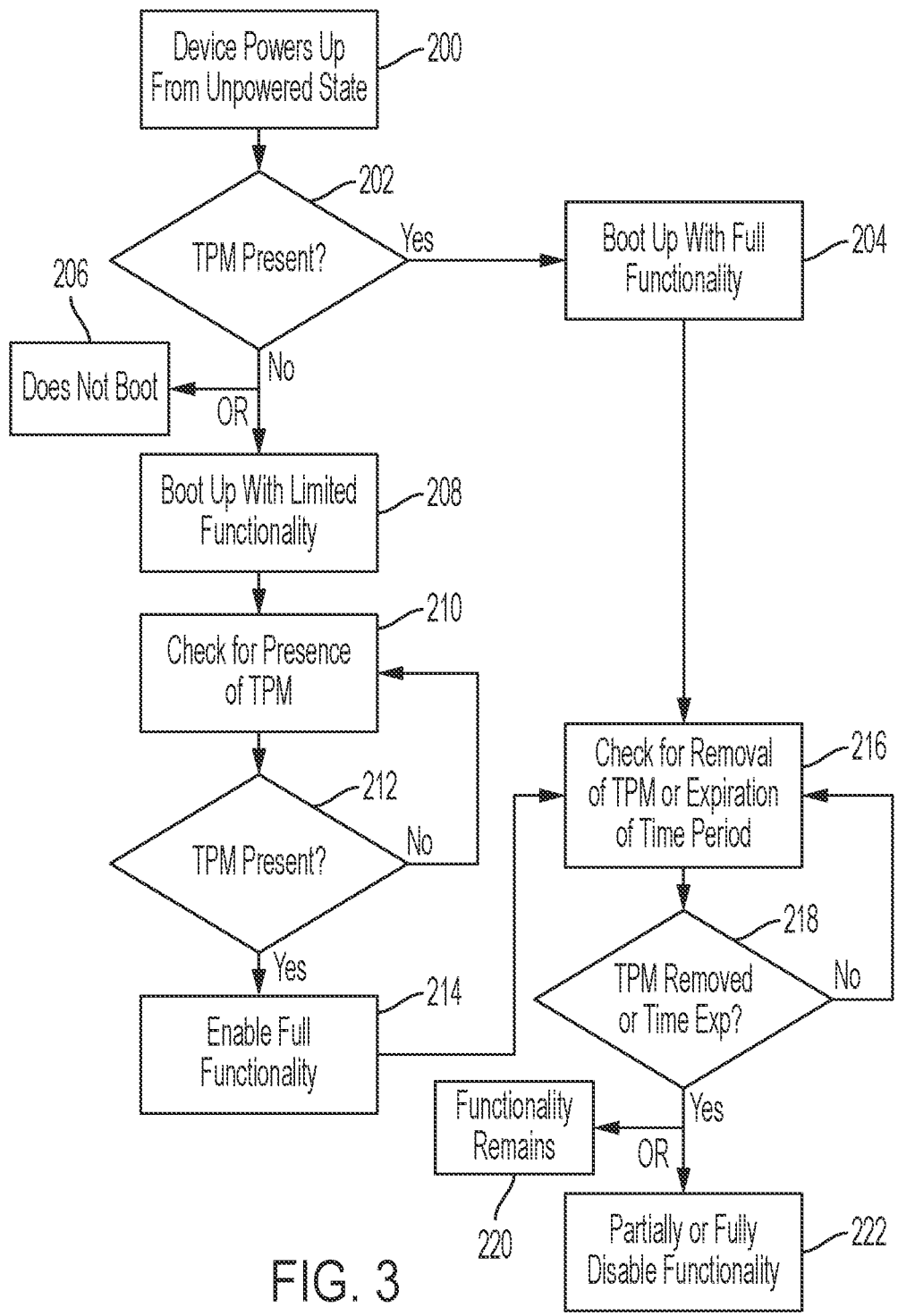
FIG. 3 is a flowchart showing operations of devices herein.

FIG. 3 shows some of the foregoing in flowchart form. Item 200 in FIG. 3 shows that a device (that has a connector adapted to connect to a removable TPM) is powered up (e.g., connected to a power source, which could be a battery or grid power). Item 202 shows that if the TPM is connected to the connector the processor is adapted to use the cryptographic key to cause the device to boot up with full functionality (204). Otherwise, if the TPM is missing, the device either does not boot at all (206) or boots with only limited functionality (208) because the processor does not have access to the cryptographic key.

In item 210, if the device booted with limited functionality, the processor is adapted to continually check whether a TPM is connected to the connector. As shown in item 212, if the TPM is detected by the connector as being recently connected, the processor is adapted to use the cryptographic key to cause the device to enable full functionality (214).

Item 216 shows that the processor is adapted to continually check if the TPM is removed from the connector. Item 216 also shows that the processor is adapted to determine if a time period has expired. The time period can usually begin as an event, such as booting up, previous disconnection of a TPM, previous enablement of full functionality, etc. The time period can be permanently or temporarily established within the processor and the processor is adapted to determine when the time period has expired.

As shown in item 218, if the TPM has been removed or if the time period has expired, processing can proceed to either item 220 or 222. As noted above, in some devices herein, even after removal of the TPM or expiration of the time period, full functionality can remain and may remain until power is disconnected (item 220). In other devices, when the TPM is removed and/or the time period has expired, the processor is adapted to partially or fully disable the functionality of the device, as shown in item 220. Item 220 can include the process of clearing all memory and buffers of all data, including user information, history, cryptographic data, etc., upon removal of the TPM.

Figure 4:
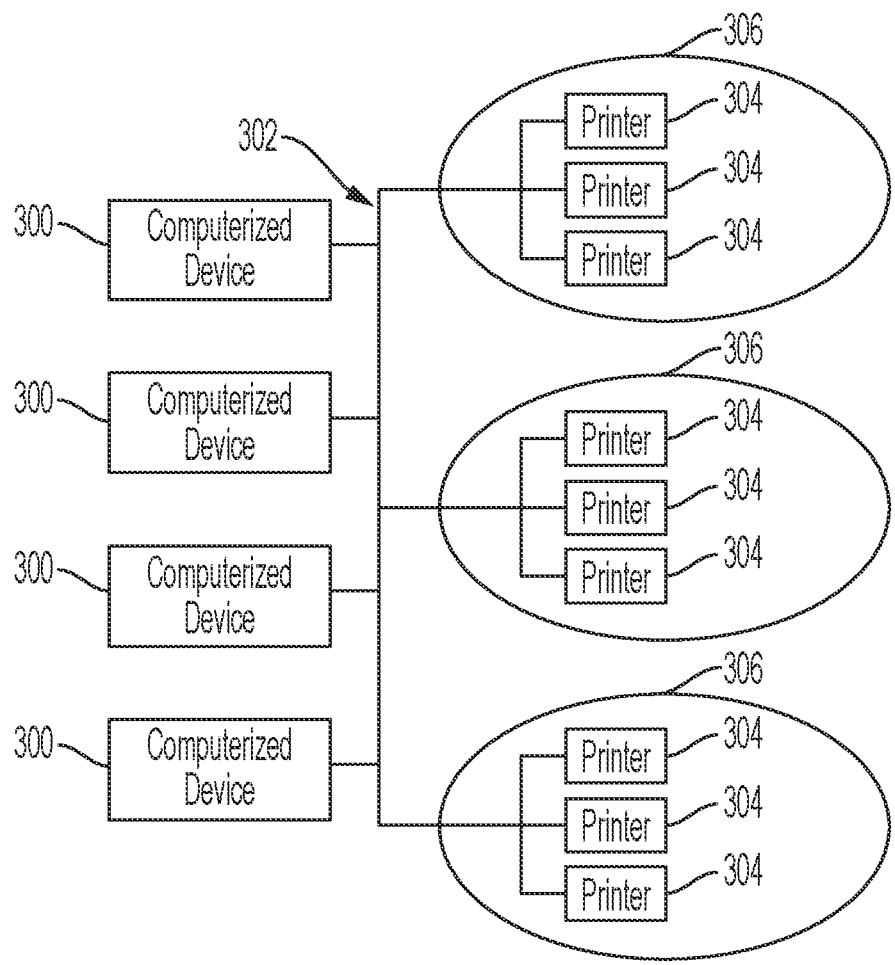
FIG. 4 is a schematic diagram illustrating systems herein.

As shown in FIG. 4, illustrates different computerized devices 300 and printers 304, which can be implemented with the features shown in FIGS. 1 and 2. Such various computerized devices 300, 304 can be located at various different physical locations 306. The computerized devices 300, 304 can include print servers, printing devices, personal computers, etc., and are in communication (operatively connected to one another) by way of a local or wide area (wired or wireless) network 302.

Figure 5:
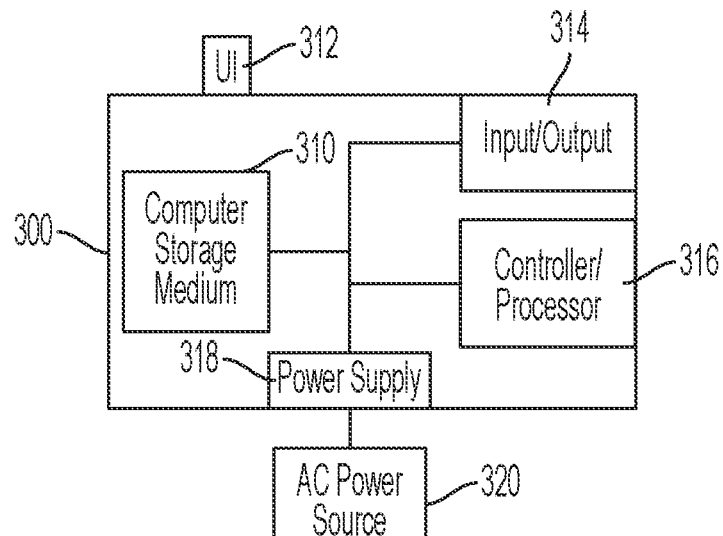
FIG. 5 is a schematic diagram illustrating devices herein.

FIG. 5 illustrates that such computers 300 herein can comprise, in addition to the features shown in FIGS. 1 and 2, a controller/tangible processor 316 and a communications port (input/output) 314 operatively connected to the tangible processor 316 and to the computerized network 302 external to the computerized device 300. Also, the computerized device 300 can include at least one accessory functional component, such as a user interface (UI) assembly 312. The user may receive messages, instructions, and menu options from, and enter instructions through, the user interface or control panel 312.

The input/output device 314 is used for communications to and from the computerized device 300 and comprises a wired device or wireless device (of any form, whether currently known or developed in the future). The tangible processor 316 controls the various actions of the computerized device. A non-transitory, tangible, computer storage medium device 310 (which can be optical, magnetic, capacitor based, etc., and is different from a transitory signal) is readable by the tangible processor 316 and stores instructions that the tangible processor 316 executes to allow the computerized device to perform its various functions, such as those described herein. Thus, as shown in FIG. 5, a body housing has one or more functional components that operate on power supplied from an alternating current (AC) source 320 by the power supply 318. The power supply 318 can comprise a common power conversion unit, power storage element (e.g., a battery, etc), etc.

Figure 6:
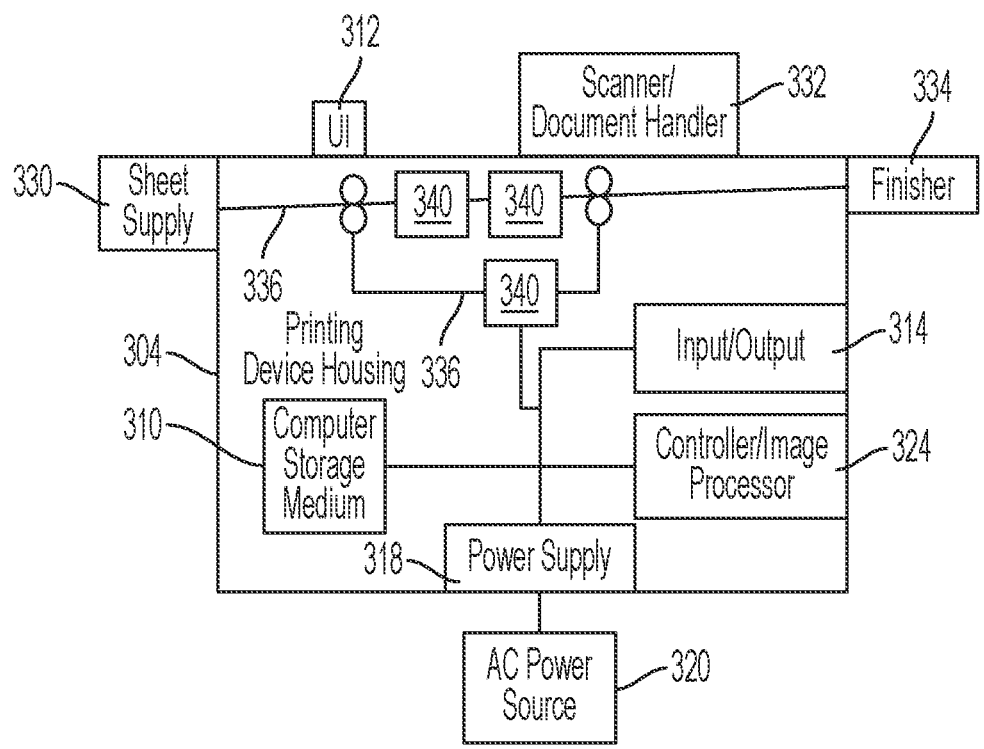
FIG. 6 is a schematic diagram illustrating devices herein.

FIG. 6 illustrates a computerized device that is a printing device 304, which can be used with systems and methods herein and can comprise, for example, a printer, copier, multi-function machine, multi-function device (MFD), etc. The printing device 304 includes many of the components mentioned above and at least one marking device (printing engine(s)) 340 operatively connected to a specialized image processor 324 (that may be different from a general purpose computer because it is specialized for processing image data), a media path 336 positioned to supply continuous media or sheets of media from a sheet supply 330 to the marking device(s) 340, etc. After receiving various markings from the printing engine(s) 340, the sheets of media can optionally pass to a finisher 334 which can fold, staple, sort, etc., the various printed sheets. Also, the printing device 304 can include at least one accessory functional component (such as a scanner/document handler 332 (automatic document feeder (ADF)), etc.) that also operate on the power supplied from the external power source 320 (through the power supply 318).

The one or more printing engines 340 are intended to illustrate any marking device that applies a marking material (toner, inks, etc.) to continuous media or sheets of media, whether currently known or developed in the future and can include, for example, devices that use an ink jet imaging system or a high-speed aqueous imaging system.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock TX, USA and Apple Computer Co., Cupertino CA, USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, CT, USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

Additionally, terms such as "adapted to" mean that a device is specifically designed to have specialized internal or external components that automatically perform a specific operation or function at a specific point in the processing described herein, where such specialized components are physically shaped and positioned to perform the specified operation/function at the processing point indicated herein (potentially without any operator input or action). In the drawings herein, the same identification numeral identifies the same or similar item.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. An apparatus comprising:
   a processing device operable with a connection to a physical cryptographic key device having a valid cryptographic key; and
   a connector adapted to connect to the physical cryptographic key device, wherein the processing device is operatively connected to the connector,
   wherein the processing device is adapted to change available functionality based on connection to, and disconnection from, the physical cryptographic key device, and
   wherein the processing device is adapted to periodically require reconnection to the physical cryptographic key device for continued functionality.

2. The apparatus according to claim 1, wherein the processing device requires the connection to the physical cryptographic key device only when powering-up from a non-powered state.

3. The apparatus according to claim 1, wherein the processing device requires the connection to the physical cryptographic key device for selected functions and does not require the connection to the physical cryptographic key device for other functions.

4. The apparatus according to claim 3, wherein the selected functions comprise security-enabled functions and the other functions comprise non-secure functions.

5. The apparatus according to claim 1, wherein the connector comprises a wireless connector.

6. The apparatus according to claim 1, wherein the processing device is adapted to end a current session and erase temporary memory when a connected physical cryptographic key device is no longer connected.

7. An apparatus comprising:
   a motherboard;
   secure processing devices connected to the motherboard, wherein the secure processing devices are only operable with a connection to a Trusted Platform Module (TPM) having a valid cryptographic key; and
   a connector adapted to connect to the TPM, wherein the secure processing devices are operatively connected to the connector,
   wherein the secure processing devices are adapted to change available functionality based on connection to, and disconnection from, the TPM, and
   wherein the secure processing devices are adapted to periodically require reconnection to the TPM for continued functionality.

8. The apparatus according to claim 7, wherein the secure processing devices require the connection to the TPM only when powering-up from a non-powered state.

9. The apparatus according to claim 7, wherein the secure processing devices require the connection to the TPM for selected functions and do not require the connection to the TPM for other functions.

10. The apparatus according to claim 9, wherein the selected functions comprise security-enabled functions and the other functions comprise non-secure functions.

11. The apparatus according to claim 7, wherein the connector comprises a wireless connector.

12. The apparatus according to claim 7, wherein the secure processing devices are adapted to end a current session and erase temporary memory when a connected TPM is no longer connected.

13. A publicly shared document processing device comprising:
    a motherboard;
    secure document processing devices connected to the motherboard, wherein the secure document processing devices are only operable with a connection to a Trusted Platform Module (TPM) having a valid cryptographic key; and
    a connector adapted to connect to the TPM, wherein the secure document processing devices are operatively connected to the connector,
    wherein the secure document processing devices are adapted to change available functionality based on connection to, and disconnection from, the TPM, and
    wherein the secure document processing devices are adapted to periodically require reconnection to the TPM for continued functionality.

14. The publicly shared document processing device according to claim 13, wherein the secure document processing devices require the connection to the TPM only when powering-up from a non-powered state.

15. The publicly shared document processing device according to claim 13, wherein the secure document processing devices require the connection to the TPM for selected functions and do not require the connection to the TPM for other functions.

16. The publicly shared document processing device according to claim 15, wherein the selected functions comprise security-enabled functions and the other functions comprise non-secure functions.

17. The publicly shared document processing device according to claim 13, wherein the connector comprises a wireless connector.

* * * * *